(12) United States Patent
Ogasawara et al.

(10) Patent No.: US 7,457,065 B2
(45) Date of Patent: Nov. 25, 2008

(54) SYSTEMS AND METHODS FOR HARD DISK DRIVE OPTIMIZATION AND MANUFACTURING (75) Inventors: Kenji Ogasawara, Fujisawa (JP); Hiroshi Yanagisawa, Kamakura (JP); Koichi Sato, Fujisawa (JP); Keishi Takahashi, Fujisawa (JP); Fuminori Sai, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 736 days.

(21) Appl. No.: 10/692,342

(22) Filed: Oct. 22, 2003

(65) Prior Publication Data
US 2004/0179285 A1 Sep. 16, 2004

(30) Foreign Application Priority Data
Nov. 28, 2002 (JP) .............................. 2002-345923

(51) Int. Cl.
G11B 27/36 (2006.01)
G11B 21/02 (2006.01)

(52) U.S. Cl. ........................................ 360/31; 360/75

(58) Field of Classification Search ....................... None
See application file for complete search history.

(56) References Cited

U.S. PATENT DOCUMENTS

| 5,812,883 | A  | * | 9/1998  | Rao .............................. 710/74  |
| 6,189,051 | B1 | * | 2/2001  | Oh et al. ...................... 717/175 |
| 6,466,387 | B1 |   | 10/2002 | Ogasawara et al.           |
| 6,603,627 | B1 |   | 8/2003  | Chainer et al.             |
| 6,738,215 | B2 | * | 5/2004  | Yatsu .......................... 360/75  |

FOREIGN PATENT DOCUMENTS

| JP | 63-087664   | 4/1988 |
| JP | 06-005008   | 1/1994 |
| JP | 2002-023965 | 1/2002 |

* cited by examiner

*Primary Examiner*—Jason C Olson
(74) *Attorney, Agent, or Firm*—Townsend and Townsend and Crew LLP; Patrick Duncan (57) ABSTRACT The data possessed by a parent hard disk drive is exported to a baby hard disk drive, which is connected to the parent hard disk drive, and thus, the baby hard disk drive executes by itself an optimization/inspection process including writing of servo information. A hard disk drive is reproduced by incorporating "DNA" used for reproduction into each hard disk drive, and then, by performing self-optimization and/or self-inspection by a new hard disk drive (baby hard disk drive), according to information supplied by a finished hard disk drive (parent hard disk drive).

27 Claims, 4 Drawing Sheets

SYSTEMS AND METHODS FOR HARD DISK DRIVE OPTIMIZATION AND MANUFACTURING

CROSS-REFERENCES TO RELATED APPLICATIONS

The present application claims priority to Japanese Patent application 2002-345923, filed Nov. 28, 2002, which is incorporated by reference herein.

BACKGROUND OF THE INVENTION

The present invention relates to a hard disk drive used as a data storage medium, and more particularly to a hard disk drive, an optimization process of which is individually executed, for example, when the drive is manufactured.

A hard disk drive (HDD) broadly used as a data storage medium for computers, and the like, comprises a magnetic head that reads user data stored on a magnetic disk or writes user data to the magnetic disk. The magnetic head is mounted to an actuator moved by a VCM (Voice Coil Motor). When the magnetic head reads/writes user data, the actuator is driven to move and position the magnetic head at a specific track. Movement of the magnetic head to a given location is controlled according to servo information stored on the magnetic disk.

On a magnetic disk such as a hard disk, a plurality of data tracks are formed in the shape of concentric circles, and servo tracks where identification data and a burst pattern are stored beforehand are formed in a radial direction on the magnetic disk. The above-mentioned servo information includes the identification data and the burst pattern. The identification data information indicates a track address for each data track. On the basis of the identification data read by the read head, a read head and a write head can judge the position of a data track. In addition, the burst pattern is composed of a plurality of burst pattern lines in which signal-stored areas are arranged at constant intervals in a radial direction on the magnetic disk, and the phases of the signal-stored areas are different from one another. According to a signal (Position Error Signal: PES) that is output from the read head in response to the burst pattern, it is possible to detect deviation, i.e., how much a position of the read head or write head deviates from a target data track.

This servo information is written to the magnetic disk in the manufacturing process before shipping the hard disk drive as a product. In order to correctly read or write user data, it is necessary to write reference servo information with accuracy. In recent years, the self-servo write (SSW) method performed by a hard disk drive itself has been proposed and has also been put into practical use, as discussed in Japanese Patent Laid-open No. 11-45405 (pages 9-10) and Japanese Patent Laid-open No. 2002-8331 (page 3).

Unlike conventional electrical machinery and apparatuses, a hard disk drive is provided with a large amount of data, such as how to write the servo information. When manufacturing the hard disk drive, a long time is spent in executing the optimization/inspection process of the newly assembled hard disk drive. This optimization/inspection process includes, for example, the following processes:

(1) a writing process for servo information;

(2) a pretest process to optimize coefficients of various kinds of servo systems and channel systems; and (3) a function/reliability verification test process on the basis of a long-run test.

However, because each of the processes requires a dedicated inspection apparatus, the investment in inspection apparatuses becomes huge when manufacturing a large amount of hard disk drives. Accordingly, the investment in inspection apparatuses increases the cost impact, which also exerts a direct influence on the decision regarding scale of production. Moreover, in a case where the self-servo-write method described in the above-mentioned Japanese patent documents is adopted, the necessity of the inspection apparatuses arises in like manner.

SUMMARY OF THE INVENTION

The present invention has been made to solve the technical problems described above. The present invention enables optimization/inspection of a new hard disk drive using a hard disk drive that has already been optimized/inspected.

The present invention also is achieves the optimization of a hard disk drive, even if there is no expensive inspection apparatus. The present invention also minimizes new investment in a mass production manufacturing facility for hard disk drives to reduce the operating cost at the time of mass production.

The present invention also regenerates a hard disk drive regardless of where it is. For the purpose of achieving the above objects, the present invention makes it possible to clone or reproduce a hard disk drive by incorporating "DNA" used for reproduction into each hard disk drive, and then, by performing self-optimization and/or self-inspection by a new hard disk drive (baby hard disk drive), according to information supplied by a finished hard disk drive (parent hard disk drive).

According to one aspect of the present invention, there is provided a hard disk drive comprising recognizing means for discerning that the hard disk drive is a baby hard disk drive in which an optimization/inspection process has not yet been completed; command transmitting means, based on the judgment of the recognizing means, for transmitting a command requesting a growth program from a parent hard disk drive; growth-program receiving means, based on the judgment of the recognizing means, for receiving from the connected parent hard disk drive the growth program required for the baby hard disk drive to perform the self-optimization/inspection process; and execution means, based on the growth program received by the growth-program receiving means, for executing the self-optimization/inspection process, thereby allowing the baby hard disk drive to "grow up" into a parent hard disk drive.

Here, the hard disk drive may characteristically further comprise a storing means for storing in memory (on a hard disk, or the like) the growth program executed by the execution means. In this case, when a new baby hard disk drive in which an optimization/inspection process has not yet been completed is connected thereafter to the hard disk drive comprising the storing means, that hard disk drive, as a parent hard disk drive, preferably supplies the baby hard disk drive with the growth program stored in the storing means. In addition, the parent hard disk drive may characteristically execute part of the optimization/inspection process to be carried out by the execution means. In this case, the execution means can effectively reduce the amount of processing of the self-optimization/inspection process to be executed by the baby hard disk drive with the support of the MPU included in the parent hard disk drive. It should be noted that the above-mentioned term "connected" includes a state in which irrespective of a wired connection or a radio connection, some communication, such as an exchange of a command, can be executed.

According to another aspect of the present invention, there is provided a hard disk drive comprising a ROM for storing a basic program that receives a growth program for performing self-optimization; and an MPU that receives the growth program according to the basic program stored in the ROM and that performs self-optimization using the received growth program.

The basic program stored in the ROM includes a function for checking whether information specific to the hard disk drive is stored in a predetermined memory, or whether servo information is written to the disk, thereby enabling recognition of a state in which optimization of the hard disk drive has yet to be performed. In addition, the MPU recognizes its own state according to this basic program.

The basic program stored in the ROM also includes a function for transmitting a command requesting that a growth program of a parent hard disk drive be connected. Moreover, after optimization processing ends, the MPU stores the growth program in a predetermined memory area, on the magnetic disk or the like, for instance.

According to still another aspect of the present invention, from the viewpoint of the parent hard disk drive, there is provided a hard disk drive comprising connection means that is adapted to connect to an unfinished hard disk drive (baby hard disk drive) where servo information is not written to a disk; storing means for storing a program by which the unfinished hard disk drive writes servo information to its own disk; receiving means for receiving a request command for the program from the unfinished hard disk drive; and supplying means, according to the request command received by the receiving means, for supplying the program stored in the storing means to the unfinished hard disk drive.

The hard disk drive is characterized in that this program includes a function for executing self-optimization/inspection processing, and that the parent hard disk drive further comprises an execution means for executing part of the self-optimization/inspection processing of the unfinished hard disk drive.

According to a further aspect of the present invention, there is provided a hard-disk-drive optimization method whereby using a first hard disk drive (parent hard disk drive) where optimization processing has already been completed, the optimization processing is executed for a second hard disk drive (baby hard disk drive) where the optimization processing has not yet been completed, the hard-disk-drive optimization method comprising the following steps: recognizing on the part of the second hard disk drive that the second hard disk drive is a hard disk drive in which optimization processing has not yet been completed; issuing a command, to the first hard disk drive, based on that recognition, requesting information used for optimization; supplying the information used for optimization, which is stored in the first hard disk drive, to the second hard disk drive; executing various kinds of processes with the second hard disk drive, based on the supplied information used for optimization, so that the second hard disk drive matures into an optimized hard disk drive; and after the second hard disk drive completes optimization processing, supplying the information used for optimization from the second hard disk drive to a third hard disk drive in which the optimization processing has not yet been completed.

In this connection, the above-mentioned "completion of optimization processing" does not merely indicate that optimization processing is entirely completed. As long as the second hard disk drive is in a state of being able to supply the information used for optimization to a third hard disk drive that is a new baby hard disk drive, there is no problem.

In this embodiment, the hard-disk-drive optimization method is characterized in that the information used for optimization, which is supplied by the first hard disk drive, includes a growth program by which the second hard disk drive executes various kinds of self-optimization processes. In addition, this information includes a test code possessed by the first hard disk drive.

Moreover, the hard-disk-drive optimization method is characterized in that the first hard disk drive executes, by itself, part of the optimization processing that the second hard disk drive should execute by itself.

According to still a further aspect of the present invention, there is provided a hard-disk-drive manufacturing method for manufacturing a second hard disk drive by use of a first hard disk drive that has already been manufactured, the hard-disk-drive manufacturing method comprising the processes of making a connection between the first hard disk drive and the second hard disk drive; supplying information from the first hard disk drive to the second hard disk drive, whereby the second hard disk drive writes servo information to one of its magnetic disks; writing servo information to one of its magnetic disks by the second hard disk drive itself, according to the supplied information; supplying information from the first hard disk drive to the second hard disk drive by which the second hard disk drive performs self-inspection; and performing self-inspection on the second hard disk drive, according to the supplied information.

In addition, the present invention can be treated as a program executed by a computer (MPU) that is built into a hard disk drive. In this case, this program allows the computer to implement the functions of recognizing through a baby hard disk drive that the baby hard disk drive is a hard disk drive in which an optimization/inspection process has not yet been completed; requesting, based on this recognition, another hard disk drive (parent hard disk drive) to transmit to the baby hard disk drive a growth program that is required for the baby disk drive to perform the self-optimization/inspection process; and receiving, based on this request, a growth program supplied from the parent hard disk drive.

In this embodiment, the function of recognizing through a hard disk drive whether an optimization/inspection process to be performed on the hard disk drive has been completed can be made, for instance, by checking whether or not information specific to the hard disk drive has been stored, or by checking whether or not servo information has been written to a disk.

According to yet another aspect of the present invention, there is provided a program allowing a computer built into a parent hard disk drive to implement the functions of receiving, from another hard disk drive (baby hard disk drive) where an optimization/inspection process has not been completed, a request for a growth program by which the baby hard disk drive executes the self-optimization/inspection process; reading the growth program stored in a memory; and supplying the another hard disk drive with the read growth program.

Additionally, if part of the optimization/inspection process of the another hard disk drive is executed, it is possible to further implement a function of reducing the amount of processing in the another hard disk drive.

Alternatively, a program according to the present invention allows a computer built into a hard disk drive to implement the functions of writing servo information to its own disk by use of information exported from another hard disk drive; and executing, by itself, an inspection process by use of the information exported from the another hard disk drive.

It should be noted that other than the case where the programs are stored beforehand in a ROM, or the like, a mode in which the program is externally provided through a given storage medium or network can also be considered.

Other objects, features, and advantages of the present invention will become apparent upon consideration of the following detailed description and the accompanying drawings, in which like reference designations represent like features throughout the figures.

DETAILED DESCRIPTION OF THE INVENTION

A preferred embodiment to which the present invention is applied is now described in detail with reference to the accompanying drawings.

Figure 1:
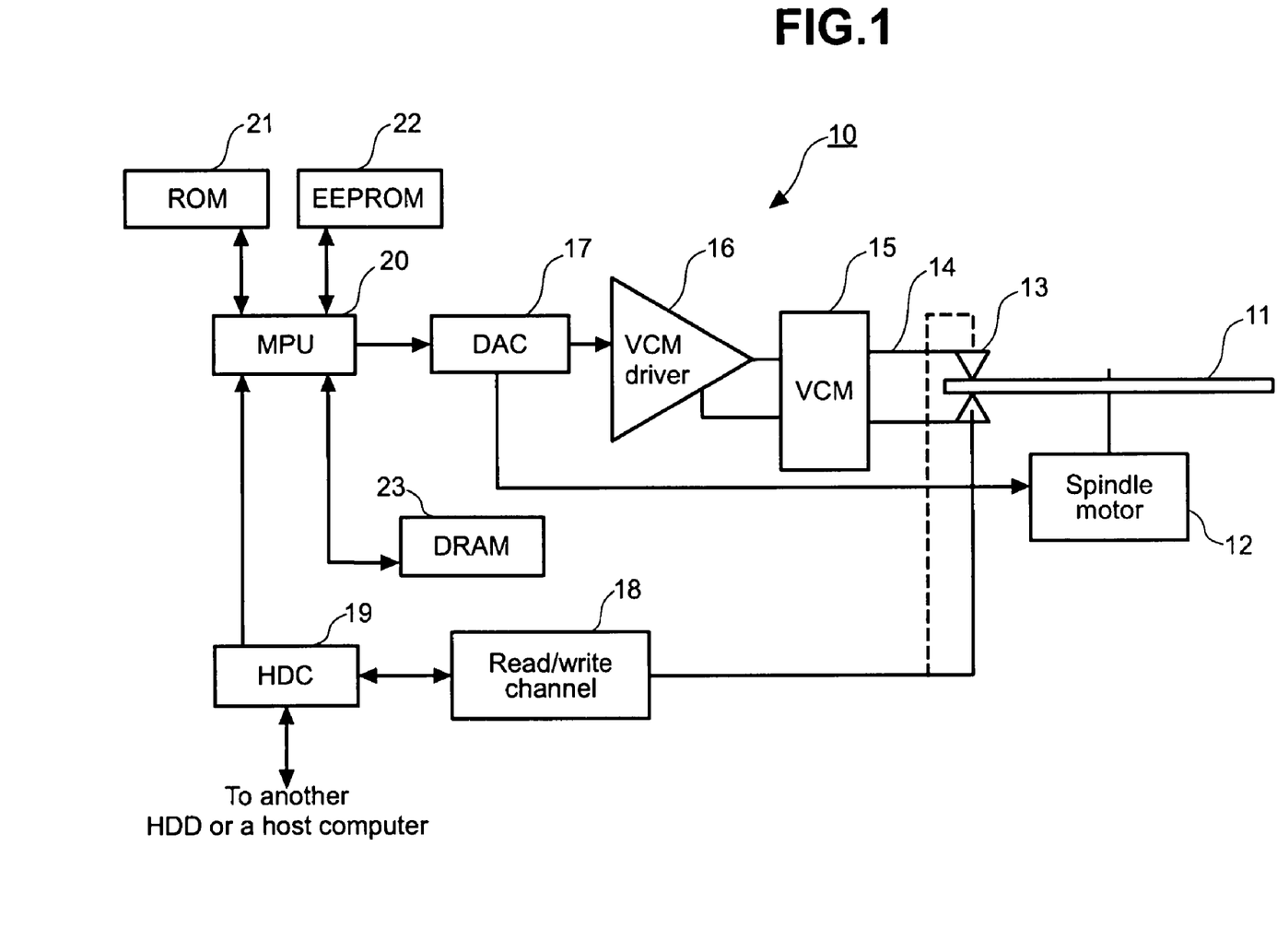
FIG. 1 is a block diagram illustrating a main configuration of a hard disk drive (HDD) to which an embodiment is applied.

FIG. 1 is a block diagram illustrating a main configuration of a hard disk drive (HDD) 10 to which this embodiment is applied. The hard disk drive 10 comprises the following: a magnetic disk 11 that is a storage medium for storing data; a spindle motor 12 for rotating the magnetic disk 11; a magnetic head 13 for reading/writing data from/to the magnetic disk 11; an actuator 14 that is a driving mechanism of the magnetic head 13; and a voice coil motor (VCM) 15 for generating driving force that causes actuator 14 to move magnetic head 13 to a given location.

Hard disk drive 10 is a data storing and reproducing unit in which magnetic head 13 performs a seek operation on magnetic disk 11 rotated and driven by spindle motor 12, and in which magnetic head 13 remains at a given track (location) to write data to magnetic disk 11 or to read data written to magnetic disk 11. Although one or more magnetic disks 11 are placed as the need arises, one magnetic disk 11 is provided as illustrated in FIG. 1 by way of example. When hard disk drive 10 is operating, magnetic disk 11 is driven to rotate around the spindle shaft of spindle motor 12. When hard disk drive 10 is not operating, magnetic disk 11 stops rotating. Two magnetic heads 13 are held at the front end of actuator 14 and act, respectively, on the top and bottom surfaces of magnetic disk 11. The two magnetic heads write/read data to/from magnetic disk 11.

Hard disk drive 10 comprises, as a control portion, a voice coil motor (VCM) driver 16, a digital-to-analog converter (DAC) 17, a read/write channel 18, and a hard disk controller (HDC) 19. Voice coil motor (VCM) driver 16 drives voice coil motor (VCM) 15. Digital-to-analog converter (DAC) 17 controls a driving electric current of voice coil motor (VCM) 15 and performs its feed forward control. Read/write channel 18 performs code modulation of data to be written and then outputs the data to a head amplifier, detects data from an output signal of the head amplifier, and performs code demodulation. Hard disk controller (HDC) 19 functions as an interface of hard disk drive 10.

Moreover, hard disk drive 10 further comprises, as the control portion, an MPU (Micro Processing Unit) 20, a ROM 21, an EEPROM (Electrically Erasable and Programmable ROM) 22, and a DRAM (Dynamic RAM) 23. MPU (Micro Processing Unit) 20 has total control of hard disk drive 10, including positioning control of magnetic head 13, interface control, initialization and settings of each peripheral LSI, and defect control. ROM 21 stores ROM codes as a basic program for executing basic functions of hard disk drive 10. EEPROM 22 is a memory where data can be rewritten or erased afterward by electrical operations, and stores parameters specific to hard disk drive 10. DRAM 23 temporarily stores a program to be executed by MPU 20, the results of operations, and the like. Note that when assembly of mechanical parts has just been completed, a program is not stored in this EEPROM 22. After the hard disk drive matures by cloning itself and the resulting an optimization/inspection process ends, parameters specific to the disk are stored in EEPROM 22.

Actuator 14 is driven by voice coil motor (VCM) 15, which is controlled by MPU 20 through digital-to-analog converter (DAC) 17, and voice coil motor (VCM) driver 16. At the time of data writing, to begin with, read/write channel 18, which performs data reading and writing operations, converts data to be written, which is transmitted from a host computer through HDC 19, into a writing signal (electric current), and then supplies the writing signal to magnetic head 13. According to the writing electric current, magnetic head 13 writes the data to magnetic disk 11. Conversely, at the time of data reading, the read/write channel 18 converts a reading signal (electric current) read from magnetic disk 11 into digital data, and then outputs the digital data to the host computer through HDC 19.

As described above, HDC 19 has functions as an interface of hard disk drive 10. One of the functions is to receive the data to be written, transmitted from the host computer, and to transmit the data to read/write channel 18. Another function is to transmit the read data transmitted from read/write channel 18 to the host computer. Further, HDC 19 has a function of transmitting the data to MPU 20 in response to an instruction command from the host computer. In this embodiment, as a substitute for the host computer, if hard disk drive 10 itself is a baby HDD, a parent HDD is connected to hard disk drive 10 as another hard disk drive 10, and if hard disk drive 10 itself is a parent HDD, a baby HDD is connected as another hard disk drive 10. Between the hard disk drives 10, for example, a command is exchanged, and a growth program is sent and received. To be more specific, besides the function of sending and receiving data upon receipt of a read/write command, which was conventionally implemented, hard disk drive 10 has a function of communicating with the other connected hard disk drive 10.

ROM 21 has previously stored a program for executing basic functions. The basic functions include (1) a function of determining whether the hard disk drive is a baby;

(2) a function of being able to transmit a command; and (3) a function of being able to receive a program.

In this case, the "baby" indicates a state in which a HDD is no more than mechanically assembled into a unit. In other words, it indicates a clean HDD before testing, in which the data required for a HDD has not been provided. To be more specific, the baby indicates a state in which a process of self-optimization/inspection has not been completed; that is a verification test of function/reliability has not been performed. Here, the verification test of function/reliability is based on a pretest and a long-run test in which servo information is written and coefficients of various kinds of servo systems and channel systems are optimized. It should be noted that "optimization/inspection" means "optimization and/or inspection".

Figure 2:
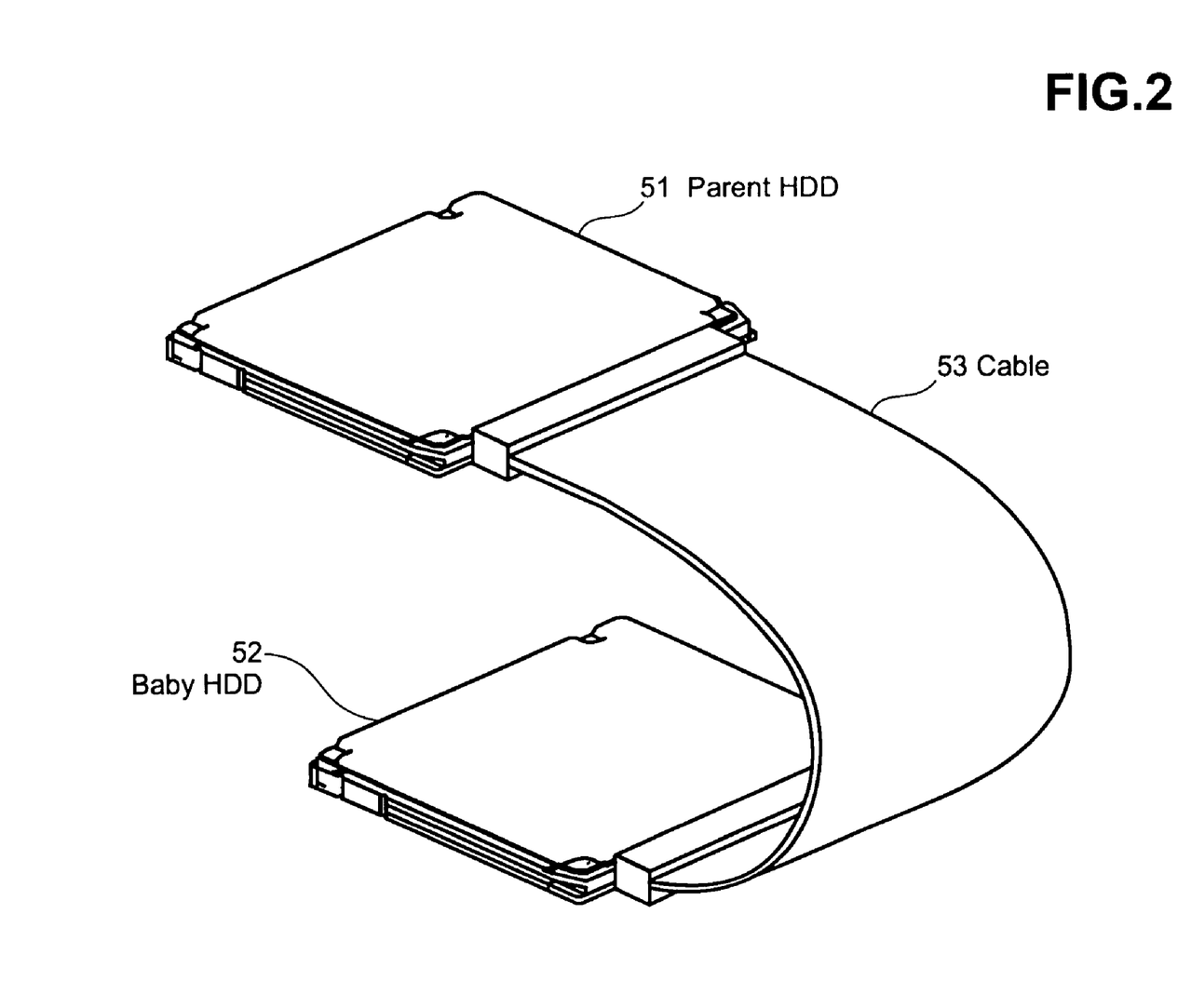
FIG. 2 is a diagram illustrating an optimization/inspection process of the hard disk drive.

FIG. 2 is a diagram illustrating the optimization/inspection process of hard disk drive 10. The optimization on the basis of device-specific information is first performed on a hard disk drive 10 that has been mechanically assembled, and then the inspection is performed before the manufacturing of hard disk drive 10 as a product is completed. Accordingly, the processing mentioned below can be considered a manufacturing method of hard disk drive 10. FIG. 2 illustrates a state in which a bus connection is made between a parent HDD 51, which is a first hard disk drive 10, and a baby HDD 52, which is a second hard disk drive 10, by use of a cable 53.

A configuration by means of a radio connection, instead of using cable 53, is also possible. Once baby HDD 52, which is the second hard disk drive 10, matures, baby HDD 52 as a parent supplies information to a third hard disk drive 10, which is a nascent baby.

Baby HDD 52 is a HDD that is no more than assembled, as described above. If baby HDD 52 is described in other words, it is an unfinished hard disk drive. In contrast, parent HDD 51 is a mature hard disk drive 10 where its own optimization/inspection process is already completed and thereby much data is already provided. Thus, if parent HDD 51 is described in other words, it is a finished hard disk drive. However, it is not always required that the optimization/inspection process be completely finished. A parent HDD has only to mature to such an extent that it can transmit a growth program to a baby HDD to help cloning. This parent HDD stores some parameters unique to itself in EEPROM 22 shown in FIG. 1. The parameters include, for example, track density (tpi, track per inch), and write current and bias current which are matched with properties of a head and a disk. Further, magnetic disk 11 stores in a given area a growth program by which a baby HDD performs the self-optimization/inspection process using microcodes and other codes.

In this embodiment, a new proposal is given to the concepts of development, manufacture, and application of hard disk drive 10.

This new proposal realizes the following functions:

(1) the HDD (parent HDD 51) self-extracts an electrical design drawing including both its own hardware and software;

(2) the HDD (parent HDD 51) then exports the design drawing to another HDD (baby HDD 52); and (3) the HDD (baby HDD 52) to which the design drawing is exported forms itself according to the design drawing.

This parallels what is called "DNA transplantation" in the biological world. Furthermore, it represents cloning of a HDD, that is, reproduction (genetic duplication) of a HDD.

As described above, there are, for example, the following specific examples of the optimization/inspection process:

(1) a writing process of servo information;

(2) a pretest process in which coefficients of various kinds of servo systems and channel systems are optimized; and (3) a function/reliability verification test process on the basis of a long-run test.

Each of the processes is executed according to information (code information, etc.) imported from parent HDD 51.

Next, a HDD reproduction method (optimization method) to which this embodiment is applied will be described.

Figure 3:
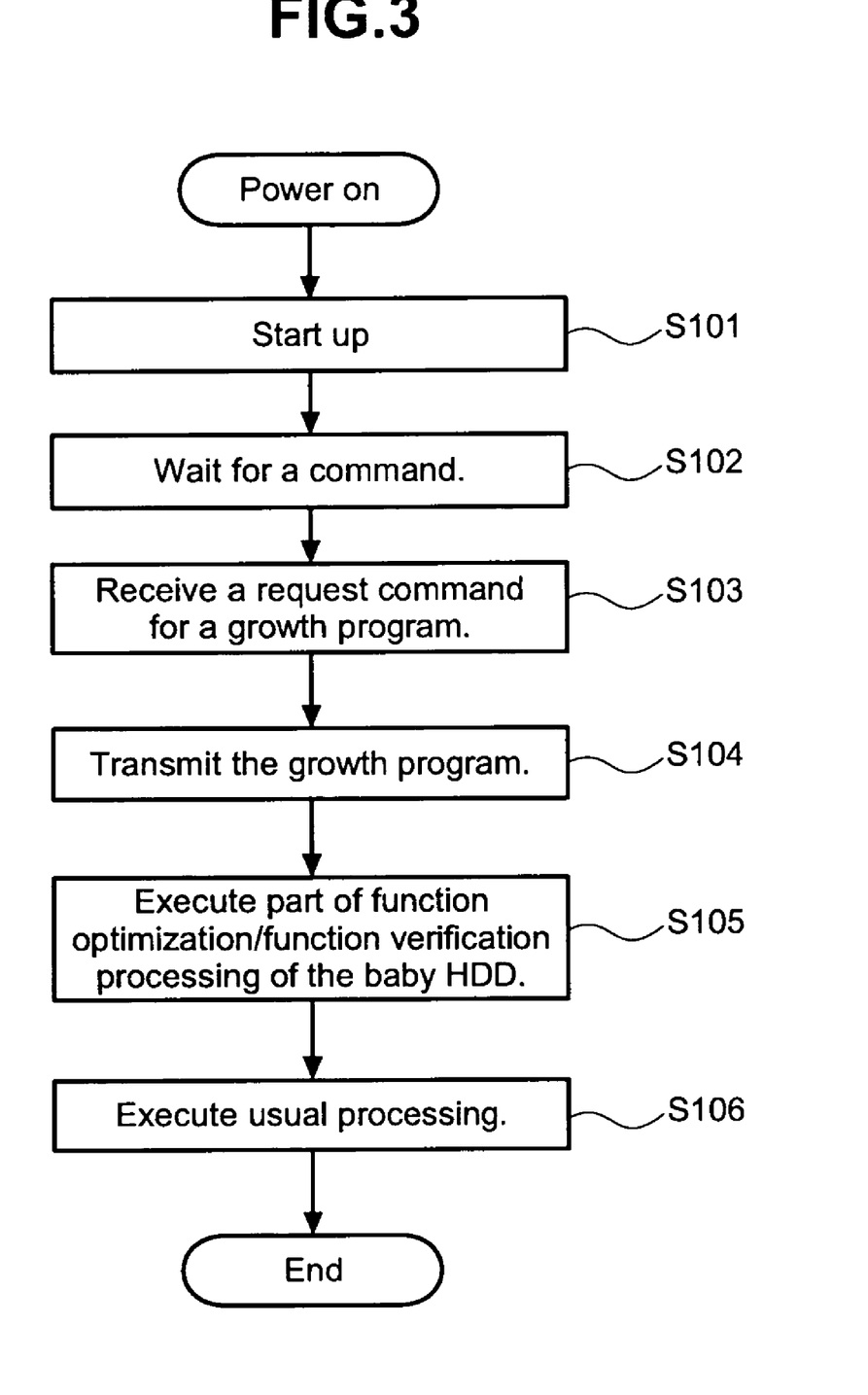
FIG. 3 is a flowchart illustrating processing executed by a MPU of a parent HDD that is a first hard disk drive.

FIG. 3 is a flowchart illustrating processing executed in MPU 20 of parent HDD 51 that is first hard disk drive 10. To begin with, a bus connection is made, by use of cable 53, between parent HDD 51 and baby HDD 52 that is second hard disk drive 10. Then, in parent HDD 51, the processing is started by switching the power supply on. Parent HDD 51 is first subjected to usual start-up processing (step 101) and waits for a command from baby HDD 52 (step 102). Upon receipt of a growth-program request command from baby HDD 52 connected to parent HDD 51 (step 103), parent HDD 51 calls a growth program from magnetic disk 11 and then transmits the growth program to baby HDD 52 through an I/O bus of cable 53 (step 104). Subsequently, as the need arises, MPU 20 executes part of function optimization processing and/or functional verification processing in baby HDD 52 (step 105). After that, usual processing is executed (step 106), and then the processing ends. The processing performed in parallel by parent HDD 51 and baby HDD 52 in the step 105 will be described in detail later.

Figure 4:
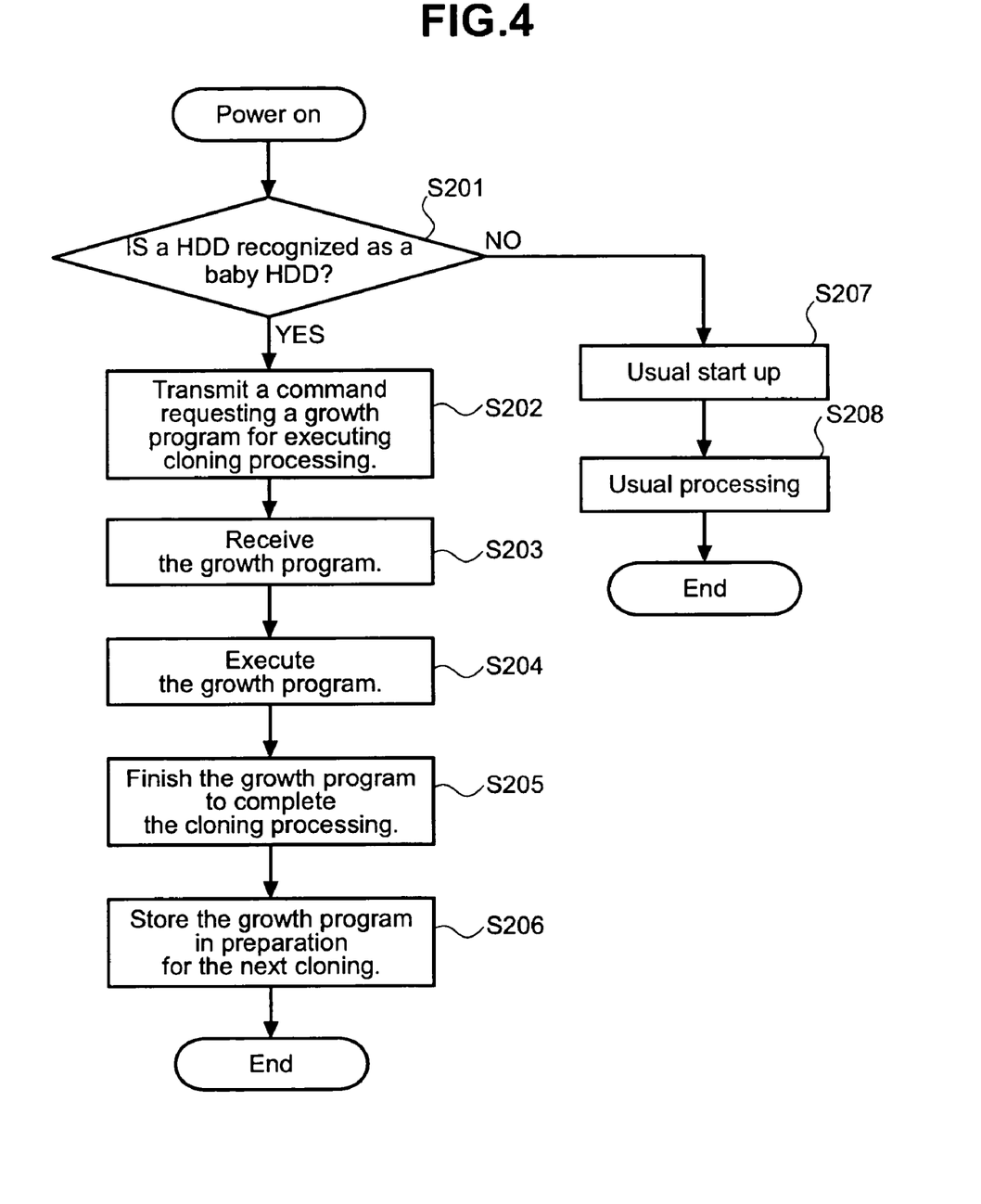
FIG. 4 is a flowchart illustrating processing executed by a MPU of a baby HDD that is a second hard disk drive.

FIG. 4 is a flowchart illustrating processing executed in MPU 20 of baby HDD 52, which is second hard disk drive 10. First, baby HDD 52 determines whether this HDD is a baby HDD that has just been mechanically assembled, and whether this HDD itself is a clean HDD (step 201). Although the determinations can be made by several methods, they are basically made by checking whether or not baby HDD 52 has information included in a mature HDD. This checking function is executed by reading ROM codes from ROM 21 where basic functions of hard disk drive 10 are stored.

A first method of determination made in step 201 could conceivably check whether EEPROM 22, which stores device-specific information, is empty (all 0). If EEPROM 22 is empty (null), this HDD can be recognized as a baby. Once the HDD matures, several parameters unique to each drive are already stored in EEPROM 22, which will therefore never result in misjudging whether the HDD is a baby or not. In addition, a second method could conceivably check whether servo information is written on a surface of magnetic disk 11. If no servo information is written, this HDD can be recognized as a baby. Once the HDD matures, servo information is already written to magnetic disk 11. Therefore, if this is checked, misjudging whether the HDD is a baby will never occur.

In this manner, if it is established that the HDD is not a baby in step 201, usual start up is executed (step 207), and, subsequently, usual processing is executed (step 208) before processing ends. If it is established that the HDD is a baby in step 201, a request command for a growth program for cloning is transmitted to parent HDD 51 (step 202). The request command is a special command that the parent HDD 51 can identify. As described above, baby HDD 52 is required to have, beforehand, a function for issuing a command. It is desirable that this interface logic be given to baby HDD 52 on the sending side instead of parent HDD 51 on the receiving side.

Next, baby HDD 52 receives the growth program through I/O bus (cable 53) (step 203). The growth program is transferred from parent HDD 51 to baby HDD 52 just as if it were DNA that was being inherited. The received growth program is temporarily stored in DRAM 23 of baby HDD 52, which is second hard disk drive 10. After that, MPU 20 reads the growth program stored in DRAM 23, and then executes the program (step 204). To be more specific, through the execution of the growth program, baby HDD 52 matures successively. This growth program has several stages. Various kinds of programs, microcodes and commands are sent from parent HDD 51 at any time. On completion of the predetermined steps, baby HDD 52 receives the next program. This is similar to a case in which a man or a woman raises the learning level of an individual from a baby to an adult in a series of steps.

As a matter of course, it is also possible to configure baby HDD 52 in a manner such that all growth programs are received at the beginning.

The execution of the growth programs is completed in this manner, and thus all of the processes including export, optimization, test, and inspection are achieved, completing the cloning (step 205). At this time, in preparation for becoming a parent that in the future will export function information to the next baby (third hard disk drive 10), baby HDD 52 stores the growth program, for example, in an area specially reserved on magnetic disk 11 (step 206) before the series of processing for growth ends. In this area, microcodes used to maintain performance of the HDD, and the like, are also stored. The above describes a case where the growth program is stored in a specific area of magnetic disk 11 that is memory. However, if sufficient memory area is ensured in storing the program, it is also possible to store the growth program in a different memory such as EEPROM 22.

Next, the execution of the growth program described in step 204 is detailed. The growth program is composed of several subprograms. These subprograms have the following functions:

(1) recognition of the HDD;
(2) optimization of parameters; and
(3) verification of performance/reliability.

Education corresponding to each of the functions is executed in steps.

To begin with, in the subprogram for recognizing the HDD shown in item (1), a model of baby HDD 52 is identified from among a group of several models. For example, by checking a preamplifier signal, the following contents are recognized: the number of magnetic heads 13; the number of disks; and the like. Judging from individual differences in mechanical and physical properties, such as properties of magnetic head 13 and magnetic disk 11, specific properties are recognized.

A program required to write servo information is output from parent HDD 51, and the same microcodes (including test codes) as those possessed by parent HDD 51 are exported. In the subprogram for optimizing parameters, shown in (2), both writing of servo information and magnetic recording are executed. In accordance with the properties of mechanical parts such as magnetic head 13 and magnetic disk 11, various kinds of parameters are determined.

Subsequently, a program for verifying performance and reliability in baby HDD 52 and various kinds of command groups are sent from parent HDD 51 at any time, and then the verification of performance/reliability shown in item (3) is executed. As a result, the inspection process of performance/reliability is totally achieved. If the parameters to be verified do not reach designed values expected at the beginning, resulting in unexpectedly poor performance, it is possible to decrease the performance values to some degree by reviewing the designed values. For example, when a capacity of 40 GHz is required as a designed value, and a capacity of only 30 GHz is obtained because of the performance of magnetic head 13, or the like, the design and the test are performed again with the capacity of 30 GHz. In this manner, according to this embodiment, because the optimization/inspection process is totally started from a baby state, it is possible to easily perform the redesign and the retest in accordance with the performance of the HDD.

Next, the processing described in step 105 of FIG. 3 is described in detail. Here, parent HDD 51 executes part of the function optimization processing and/or the function verification processing in baby HDD 52.

As described above, MPU 20 of baby HDD 52 performs operations during cloning. However, even if the function of MPU 20 is improved, performing the processing only by MPU 20 of baby HDD 52 will lead to an increased load on MPU 20. If a reduction in the load of MPU 20 in baby HDD 52 is tried for this reason, the range of the operation is limited, leading to insufficient optimization. As a result, the properties and reliability of finished hard disk drive 10 become poor. In addition, to make up for this, if hard disk drive 10, which is baby HDD 52, is equipped with a powerful MPU 20, an increase in cost cannot be avoided. It is not desirable to incur a heavy expenditure for the purpose of functional enhancement that is not directly related to customer use. For this reason, this embodiment, solves the problem by performing parallel processing between baby HDD 52 and parent HDD 51 in a manner in which parent HDD 51 helps baby HDD 52 perform the growth processing.

More specifically, in this embodiment, the "function optimization program" and the "functional verification program" of parent HDD 51 is exported to the clean baby HDD, 52 which has just been assembled. Then, operation is performed in baby HDD 52 according to the programs. At the same time, some batch processing parts among the operation groups are passed to parent HDD 51 where MPU 20 of parent HDD 51 performs the batch processing. This enables improvement in performance of operation. For example, a function of FFT (Fast Fourier Transform) usually performed to optimize the function of baby HDD 52, and the like, can usually be handled by batch processing. Accordingly, it is desirable that the parent HDD take charge of the functions.

It should be noted that if this way of thinking is extended, cloning processing for hard disk drive 10 as the next baby for matured baby HDD 52 can be started before a test for cloning processing of matured baby HDD 52 itself ends. To be more specific, because the respective cloning tests for a parent and a baby can be performed in parallel, this can also be applied to applications improving productivity to a large extent.

Thus, in this embodiment, the data possessed by parent HDD 51 is exported to baby HDD 52 connected to parent HDD 51; baby HDD 52 can execute the optimization/inspection process by itself, such as writing servo information in order to mature. In the above-mentioned description, a case where baby HDD 52 is manufactured is taken as the main example. However, if the idea is further extended, the following mode, for instance, can also be considered: After parent HDD 51 is installed at a customer's site, the data is exported at the customer's site, and then, instead of using parent HDD 51, baby HDD 52 is used as the customer's hard disk drive 10. Moreover, for example, the following mode can also be employed: if the hard disk drive 10 is connected to a PC, baby HDD 52 is directly connected to the PC and then, using a communication function of the PC, data is imported and a growth program is received from a server connected to a network such as the Internet.

As described above, according to the present invention, on the basis of information obtained from a hard disk drive whose optimization/inspection has already been performed, a new hard disk drive can perform self-optimization/inspection by itself.

A hard disk drive comprises a ROM 21 that stores a basic program for receiving a growth program used for self-optimization; and a MPU 20 that receives the growth program according to the basic program stored in ROM 21, and that performs the self-optimization according to the received growth program. The basic program stored in ROM 21 is used to check whether or not information specific to hard disk drive 10 is stored in an EEPROM 22, or to check whether or not servo information is written to a magnetic disk 11, in order to recognize a state in which optimization of the hard disk drive itself has been performed.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A hard disk drive comprising:
    logic for sending a request command for a growth program to an optimized hard disk drive on which at least one instruction of the growth program has at least been executed by a processor of the optimized hard disk drive, wherein the growth program contains instructions for performing at least one process of a writing process of writing servo information onto a disk of the hard disk drive, a pretest process that optimizes parameters of servo systems and/or channel systems of the hard disk drive, and a verification test process that verifies whether the optimized parameters provide design values for operation of the hard disk drive;
    a ROM that stores a basic program that receives the growth program;
    a MPU for receiving the growth program according to the basic program stored in the ROM, and performing the instructions of the received growth program; and
    a connector for connecting to a non-optimized hard disk drive that has a disk that has not been optimized and for transmitting the growth program to the non-optimized hard disk drive.

2. A hard disk drive according to claim 1, wherein:
    the basic program stored in the ROM includes a function of recognizing that the hard disk drive is in a state in which the growth program has not yet been performed; and
    the MPU recognizes its own state according to the basic program.

3. A hard disk drive according to claim 1, wherein:
    the basic program stored in the ROM includes a function for transmitting the command requesting the growth program to the optimized hard disk drive to be connected.

4. A hard disk drive according to claim 1, wherein:
    after execution of the growth program, the MPU stores the growth program in a predetermined memory.

5. A hard-disk-drive optimization method, using a first hard disk drive where an optimization processing has already been completed, for executing the optimization processing on a second hard disk drive where the optimization processing has not yet been completed, said method comprising:
    completing an optimization processing of the first hard drive with information used for optimization, wherein the optimization processing includes optimizing parameters of servo systems and/or channel systems of the first hard drive;
    supplying the information used for optimization, which is included in the first hard disk drive, from the first hard disk drive to the second hard disk drive; and
    controlling, according to the supplied information used for optimization, the second hard disk drive to execute processes so as to mature into an optimized hard disk drive.

6. A hard-disk-drive optimization method according to claim 5, further comprising the steps of:
    recognizing by the second hard disk drive itself that the optimization processing to be performed on the second hard disk drive has not yet been completed; and
    issuing, according to the recognition, a command requesting the information used for optimization to the first hard disk drive.

7. A hard-disk-drive optimization method according to claim 5, further comprising the step of:
    after the second hard disk drive has completed the optimization processing, supplying the information used for optimization from the second hard disk drive to a third hard disk drive in which the optimization processing has not yet been completed.

8. A hard-disk-drive optimization method according to claim 5, wherein:
    the information used for optimization, which is supplied from the first hard disk drive, includes a growth program by which the second hard disk drive executes optimization processes.

9. A hard-disk-drive optimization method according to claim 8, wherein:
    the information used for optimization, which is supplied from the first hard disk drive, includes a test code possessed by the first hard disk drive.

10. A hard-disk-drive optimization method according to claim 5, wherein:
    the first hard disk drive executes part of the optimization processing to be executed by the second hard disk drive.

11. A hard-disk-drive optimization method according to claim 5, wherein the optimization of the second hard disk drive includes writing servo information to a disk of the second hard disk itself.

12. A hard-disk-drive optimization method according to claim 5, wherein the optimization of the second hard disk drive includes performing an inspection on the second hard disk itself.

13. A computer readable medium encoded with program instructions for controlling a processor built into a hard disk drive to implement the functions of:
    receiving, at the hard disk drive from another hard disk drive in which a optimization/inspection process has only been partially completed, a request for a growth program by which the another hard disk drive executes the optimization/inspection process by itself, wherein the growth program contains instructions for performing at least one process of a writing process of writing servo information onto a disk of the hard disk drive, a pretest process that optimizes parameters of servo systems and/ or channel systems of the hard disk drive, and a verification test process that verifies whether the optimized parameters provide design values for operation of the hard disk drive;
    reading out the growth program stored in a memory of the hard disk drive; and
    supplying the another hard disk drive with the growth program read out.

14. A computer readable medium according to claim 13, further implementing the function of:
    executing a part of the optimization/inspection process of the another hard disk drive.

15. A computer readable medium encoded with program instructions for controlling a processor built into a hard disk drive to implement the functions of:
    writing servo information to a disk of the hard disk drive by use of information exported from another hard disk drive;
    executing an inspection process on the hard disk drive by use of the information exported from the another hard disk drive, wherein the inspection process involves reading out the servo information written to the disk of the hard disk; and
    exporting information to a third hard disk drive for the third disk drive to execute an inspection process.

16. A hard disk drive comprising:
recognizing means used for recognizing that an optimization/inspection process to be performed on the hard disk device has not yet been completed;
growth-program receiving means, based on the recognition of the recognizing means, for receiving from a parent hard disk drive connected to the hard disk drive a growth program necessary for performing the optimization/inspection process on the hard disk drive itself, wherein the growth program contains instructions for performing at least one process of a writing process of writing servo information onto a disk of the hard disk drive, a pretest process that optimizes parameters of servo systems and/or channel systems of the hard disk drive, and a verification test process that verifies whether the optimized parameters provide design values for operation of the hard disk drive; and
execution means, based on the growth program received by the growth-program receiving means, for executing the optimization/inspection process on the hard disk drive itself,
wherein the recognizing means checks one or more values stored in an EEPROM of the hard disk drive to recognize that an optimization/inspection process to be performed on the hard disk device has not yet been completed.

17. A hard disk drive according to claim 16, further comprising command transmitting means, based on the recognition of the recognizing means, for transmitting a command requesting the growth program to the parent hard disk drive.

18. A hard disk drive according to claim 16, further comprising storing means for storing in a memory the growth program executed by the execution means;
wherein, if the hard disk drive is thereafter connected to another hard disk drive in which the optimization/inspection process has not yet been completed, the growth program stored in the storing means is supplied to the another hard disk drive.

19. A hard disk drive according to claim 16, wherein:
circuitry on the parent hard disk drive controls a predetermined part of the optimization/inspection process to be executed by the execution means.

20. A computer readable medium encoded with program instructions for controlling a processor built into a hard disk drive to implement the functions of:
recognizing that an optimization/inspection process to be performed on the hard disk drive has not yet been completed;
requesting, based on the recognition, another hard disk drive to supply a growth program that is required to perform the optimization/inspection process by the hard disk drive itself, wherein the growth program contains instructions for performing at least one process of a writing process of writing servo information onto a disk of the hard disk drive, a pretest process that optimizes parameters of servo systems and/or channel systems of the hard disk drive, and a verification test process that verifies whether the optimized parameters provide design values for operation of the hard disk drive; and
receiving, based on the request, the growth program supplied from said another hard disk drive, wherein the optimization/inspection process is such that it is required to be executed prior to writing any user data to magnetic disks of the hard disk drive.

21. A computer readable medium according to claim 20, wherein:
the recognizing function recognizes that the optimization/inspection process to be performed on the hard disk device has not yet been completed, by checking whether or not information specific to the hard disk drive is stored, or by checking whether or not servo information is written to a disk of the hard disk device.

22. A hard disk drive comprising:
connection means adapted to be connected to an unfinished hard disk drive where servo information is not written to a disk of the unfinished hard disk drive;
storing means for storing a first program by which the unfinished hard disk drive writes servo information to at least one disk of the unfinished hard disk drive and by which the hard disk drive writes servo information to at least one disk of the hard disk drive;
supplying means for supplying the unfinished hard disk drive with the first program stored in the storing means; and
requesting means for sending a request command for the first program from a finished hard disk drive where servo information has been written to at least one disk of the finished hard disk drive.

23. A hard disk drive according to claim 22, further comprising:
receiving means for receiving a request command for the first program from the unfinished hard disk drive;
wherein the supplying means supplies the first program on the basis of the request command received by the receiving means.

24. A hard disk drive according to claim 22, wherein:
said first program includes a function of executing optimization/inspection processing, and the hard disk drive further includes execution means for executing part of the optimization/inspection processing on the unfinished hard disk drive.

25. A hard disk drive according to claim 22, farther comprising a ROM that stores a basic program that receives the first program.

26. A hard disk drive according to claim 25, wherein the basic program includes a function of recognizing that the hard disk drive is in a state in which the servo information has not been written to at least one disk of the hard disk drive; and further comprising an MPU that performs the writing of the servo information and that recognizes its own state according to the first program.

27. A hard disk drive according to claim 26, wherein after the optimization ends, the MPU stores the first program in a predetermined memory.

* * * * *

UNITED STATES PATENT AND TRADEMARK OFFICE
CERTIFICATE OF CORRECTION

PATENT NO.         : 7,457,065 B2
APPLICATION NO.    : 10/692342
DATED              : November 25, 2008
INVENTOR(S)        : Kenji Ogasawara et al.

It is certified that error appears in the above-identified patent and that said Letters Patent is hereby corrected as shown below:

Claim 25, Column 14, Line 44, please delete "farther" and insert --further--.

Signed and Sealed this

Tenth Day of February, 2009

JOHN DOLL
*Acting Director of the United States Patent and Trademark Office*